Aug. 18, 1953
H. E. KRANENBERG
2,649,067
DEVICE FOR MAKING HOLLOW BODIES OF SHEET
METAL UNDER HYDRAULIC PRESSURE
Filed Feb. 15, 1952
5 Sheets-Sheet 1
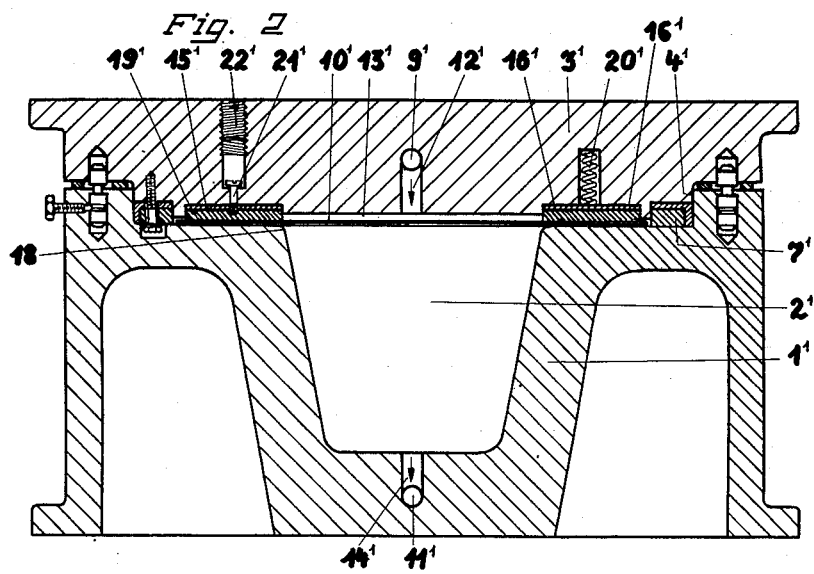
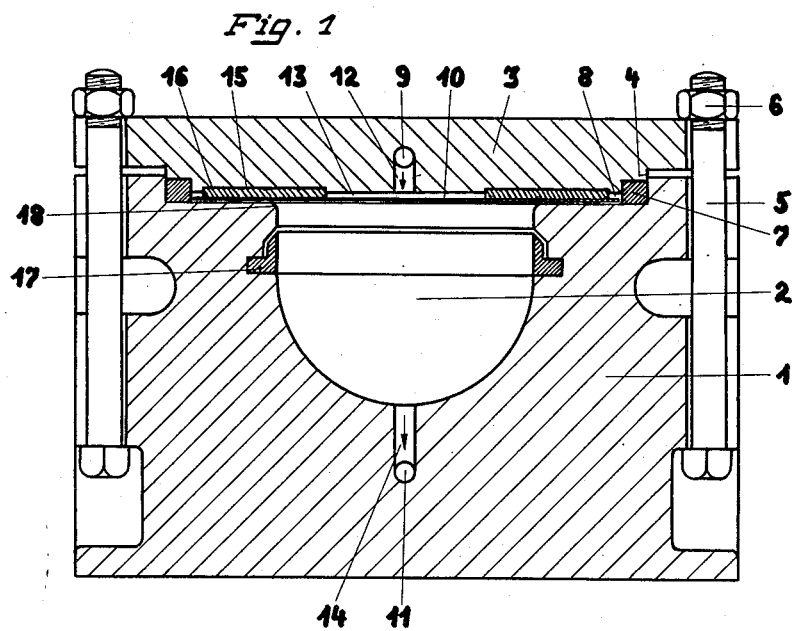
INVENTOR.
Heinrich Ewald Kranenberg
BY Aug. 18, 1953 H. E. KRANENBERG 2,649,067
DEVICE FOR MAKING HOLLOW BODIES OF SHEET
METAL UNDER HYDRAULIC PRESSURE
Filed Feb. 15, 1952 5 Sheets-Sheet 2
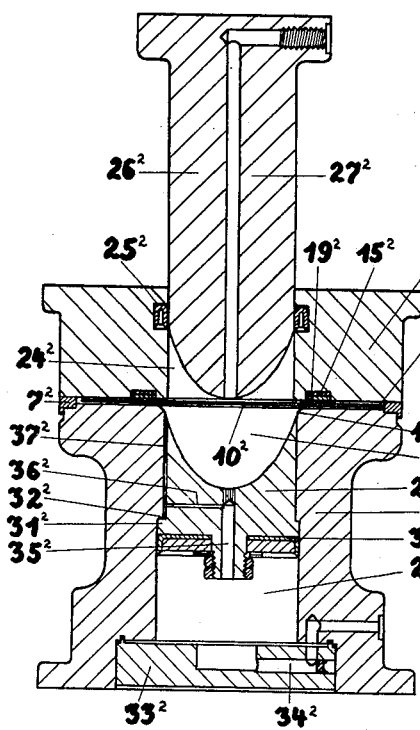
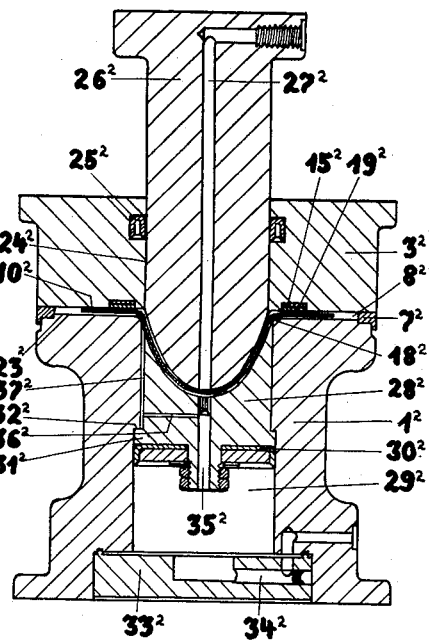
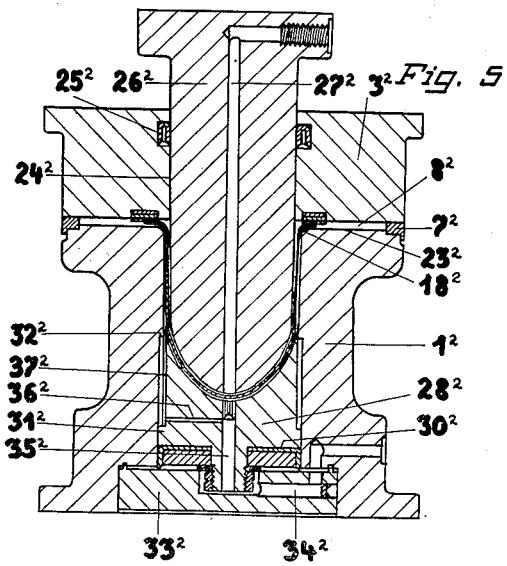
INVENTOR.

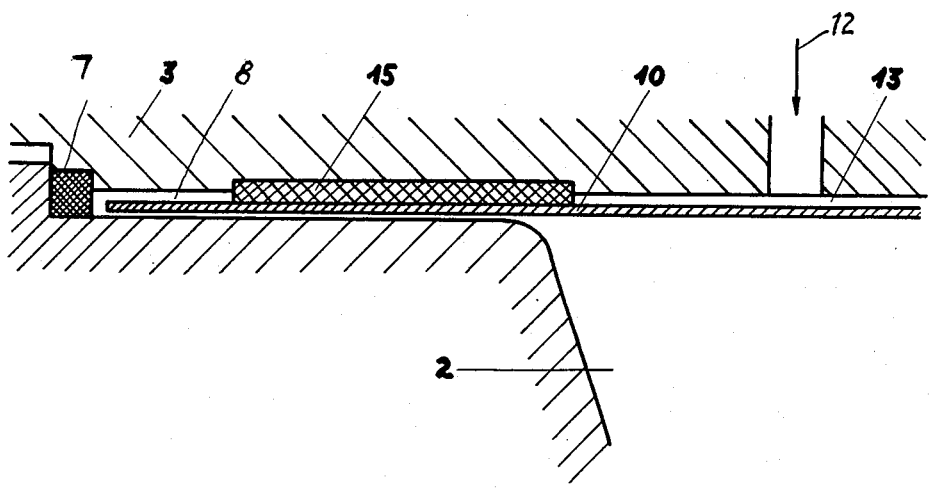

Aug. 18, 1953

H. E. KRANENBERG 2,649,067

DEVICE FOR MAKING HOLLOW BODIES OF SHEET
METAL UNDER HYDRAULIC PRESSURE

Filed Feb. 15, 1952

INVENTOR.

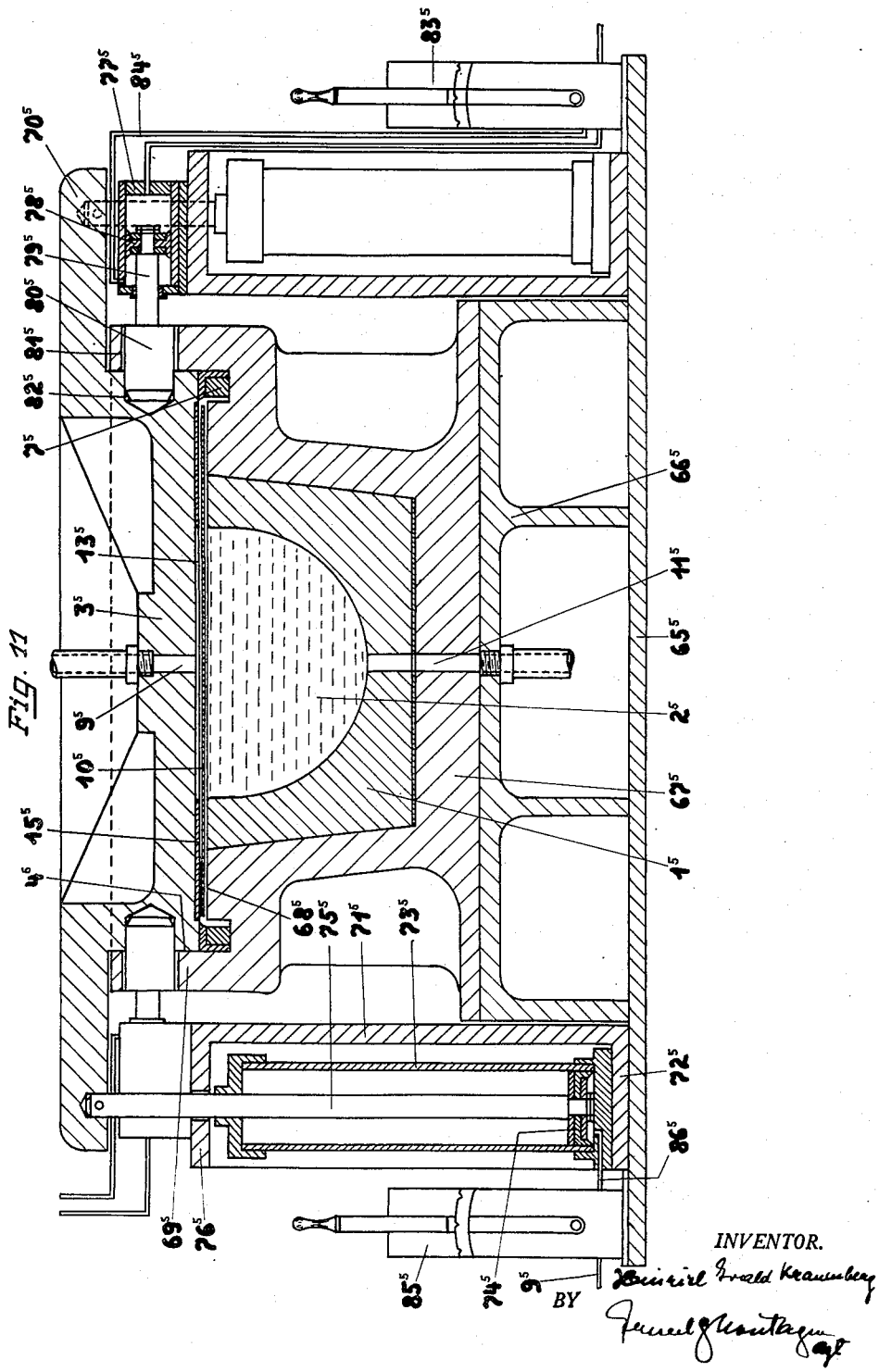

Patented Aug. 18, 1953

2,649,067

UNITED STATES PATENT OFFICE 2,649,067

DEVICE FOR MAKING HOLLOW BODIES OF SHEET METAL UNDER HYDRAULIC PRESSURE

Heinrich Ewald Kranenberg, Remscheid-Lennep, Germany

Application February 15, 1952, Serial No. 271,659
In Germany December 16, 1949

4 Claims. (Cl. 113—44)

The present invention relates to a device for making or forming hollow bodies of sheet metal under hydraulic pressure in general, and such device which permits of such forming preferably in one single step.

It is known in the forming of hollow bodies from a plain sheet metal to press the latter into a die by subjecting the face of the sheet metal disposed opposite to the recess of the die to hydraulic pressure, the sheet metal being clamped between the die and a cover, thereby pressing the sheet metal into the die, at the same time expanding the sheet metal.

This method brings about the disadvantage that, particularly if the drawing of the sheet metal is of appreciable length, the thickness of the sheet metal is so much reduced that bruises and folds are formed and even often a tearing of the sheet metal occurs.

It has been proposed, therefore, to clamp the sheet metal yieldingly between two elastic plates and to feed the hydraulic fluid of high pressure into a pressing bag. This method, however, can be used only if the pressing forces are comparatively small, that means, in connection with very thin metal sheets and small bodies, since the pressing-bag is destroyed very easily otherwise.

It has also been proposed to perform the pressing step of cylindrical bodies, which have been subjected to a preliminary step, by subjecting the thus prepared cylindrical body directly to the pressing fluid, filling the die itself also with fluid which escapes, due to the exertion of the pressure force. Yet, in this case, it is necessary for sealing purposes to provide wide and unyielding edges of the workpiece which are clamped between the sealing faces so that the forming of the hollow body is achieved only by reducing of the thickness of the sheet metal.

It is, therefore, one object of the present invention to provide a device for the forming of hollow bodies which permits of the forming by means of direct application of a hydraulic fluid simultaneously with a hydraulic counter-pressure and also to form in such manner that the sheet metal is drawn without reducing the thickness of the metal brought about by application of the pressure force.

It is another object of the present invention to provide a device for forming of hollow bodies in which a slot is disposed between the supporting faces of the die and that of its cover, the slot being closed up outwardly and of such dimensions that the pressure fluid may form a thin veil between the guiding faces for the edge of the sheet metal, the thin liquid veil reducing the friction in the sliding movement of the sheet metal edges, thereby preventing the tearing of the sheet metal.

It is a further object of the present invention to provide a device for forming of hollow bodies which comprises a die and a cover therefor, an exchangeable distancing ring being disposed between the die and its cover in order to form a guide slot of a width which is slightly larger than the thickness of the sheet metal, the distancing ring being sealed to the cover.

It is yet another object of the present invention to provide a device for forming of hollow bodies which includes a sealing ring disposed on the sheet metal and which is adapted to seal a guide slot connected with a pressure chamber, the said sealing ring preventing also a movement of the metal sheet and being of a shape complementary to the shape of the body to be formed.

It is still a further object of the present invention to provide a device for forming of hollow bodies which includes sealing rings disposed on the metal sheets and adjustable in accordance with the thickness of the metal sheets, the edges of the metal sheets being covered by a thin liquid veil and the said sealing rings permitting a control of the friction encountered by the sheet edge, thereby permitting the forming of bodies in one cold step, which otherwise would require several successive steps.

It is yet an object of the present invention to provide a device for forming of hollow bodies which includes sealing rings disposed in the die below the draw-radii.

It has been found that the drawing way for the hollow bodies is comparatively limited when such additional sealing rings are provided in the die below the draw-radii. This is brought about because the wall of the hollow body is pressed toward the wall of the die by hydraulic pressure, thereby preventing the sliding movement of the metal sheet, and tears or the like occur in the bottom portion of the body.

It is, therefore, yet another object of the present invention to provide a device for forming of hollow bodies in which a sealing ring is provided below the draw-radii in the die and a guide slot is disposed in the forming portion of the die in order to provide a thin liquid veil between the die wall and the wall of the workpiece.

It is still an object of the present invention to provide a device for forming hollow bodies which includes a deep-draw auxiliary piston having a diameter which differs from the diameter of the deep-draw member for slightly more than the thickness of the metal sheet.

It is also an object of the present invention to provide a device for forming of hollow bodies, in which, in the form-shaping portion of the die, liquid of predetermined pressure is provided to create a hydraulic counter-pressure, the said liquid being pressed into slots disposed between the die wall and that of the body to be formed, thereby forming a liquid veil favoring the sliding of the workpiece in vertical working direction.

It is still another object of the present invention to provide a device for forming of hollow bodies which comprises a movable bottom die to which the workpiece is formed at first and which movable die starts its downward movement afterwards.

It is still another object of the present invention to provide a device for forming of hollow bodies, in which the hydraulic fluid is fed through the deep-draw piston while the liquid creating the counter-pressure is fed through the form die which includes a channel for feeding the counter-pressure liquid to its wall, the latter being preferably equipped with a longitudinally extending slot, thereby permitting the feeding and distribution of the counter-pressure liquid into the draw-space.

It is yet another object of the present invention to provide a device for forming of hollow bodies, having a movable forming die, the latter being formed as differential piston, the portion having the smaller diameter being guided along the forming walls.

It is still an object of the present invention to provide a device for forming of pre-formed, hollow bodies, which includes sealing sleeves disposed at the ends of the die and extending into the end of the hollow body as well as abutting the inner wall of the hollow body upon application of pressure, thereby providing means for forming of barrels, conically shaped hollow bodies, vase-shaped bodies or urns, merely requiring to pre-form the sheet metal to a cylinder or to a truncated cone, the sealing sleeves being preferably of rubber or other elastic material.

It is still an object of the present invention to provide such device for forming of hollow bodies in which device just one such rubber sleeve is provided, which rubber sleeve is formed to a ring which extends at an angle to the inner wall of the hollow body, particularly when pressure up to 100 atmospheres is applied, while in case of forming of such metal sheets which require a pressure of more than 100 atmospheres, the sleeve is formed in such manner that a cover of a disc abuts the inner wall of the sleeve flange, the disc being mounted on the feeding pipe for the pressure liquid.

It is also known to produce hollow bodies from a pre-formed cylindrical body, as used for milk cans or milk jugs and bottles, yet the forming of such bodies requires appreciable work in the drawing process and also some time loss brought about by the necessary following glowing and dipping of the workpiece after each drawing step.

It is, therefore, still another object of the present invention to provide a device for forming of hollow bodies which permits of the cold forming of such hollow bodies in one single step. This is achieved by using a pre-formed workpiece in which a divided core is inserted and the free edge of the workpiece which extends over the end portion of the finished workpiece is removed by means of a guide slot provided in the die and particular use of hydraulic pressure with hydraulic counter-pressure.

It is another object of the present invention to provide such device for forming of hollow bodies in which, for this purpose, the upper portion of the die is equipped with an extension which corresponds with the reduced diameter of the workpiece and which extension reaches to the bottom of the workpiece, and the upper portion of the die is also equipped with a form space which surrounds the mentioned extension and which coincides with the guiding slot.

A device is also known in which the means receiving the pressure force between the die and its cover comprises bolts which are disposed parallel to the pressure force and which bolts may be formed, by example, as folding screws. An unequal tightening of these screws or bolts, respectively, causes easily a fold formation or tearing of the metal sheet to be worked.

It is, therefore, still an object of the present invention to provide a device for forming of hollow bodies in which the pressure fluid is used in such manner that the pressure fluid itself may be used for the mechanical locking of the die. This is brought about by providing a block which receives the die, which block is equipped with a cover movable in guides and secured by a special locking means. Such formation permits the use of comparatively large pressure forces without interfering with the arrangement of the multiplicity of locking means.

It is yet another object of the present invention to provide a device for forming of hollow bodies comprising a block having a guide for the cover in which locking means are disposed, which locking means penetrate the cover, thereby providing a centralization of the cover during its mechanical movement.

It is yet another object of the present invention to provide a flange extending in peripheral direction from the top of the cover, and piston rods extending from hydraulic lifting cylinders are secured to the said flange of the cover in order to permit of a fast opening and closing movement of the die by using the available hydraulic liquid.

It is still another object of the present invention to provide a device for forming of hollow bodies which comprises a framework which includes hydraulic lifting cylinders and which includes hydraulic pressure cylinders for the locking means of the cover, the framework supporting an exchangeable block which receives the die.

With these and other objects in view, which will become apparent in the following detailed description, the present invention will be clearly understood in connection with the accompanying drawings, in which:

Figure 1 is a sectional elevation of one embodiment of a die for forming of hollow bodies from a plane metal sheet, also disclosing the elastic sealing ring for the die;

Fig. 2 is a sectional elevation of a second embodiment of the present invention;

Fig. 3 shows the sectional elevation of an embodiment disclosing a hydraulic forming device for deep-forming of hollow bodies;

Fig. 3a is a fragmentary section of the die indicating the space between the working sheet metal and the shoulders of the forming member.

Fig. 4 is a sectional elevation of the embodiment shown in Fig. 3 at a different stage of the forming process;

Fig. 5 shows a sectional elevation of the embodiment disclosed in Fig. 3 at the end of the forming process;

Fig. 11 is a sectional elevation of a pressure device for forming of hollow bodies which includes means for operation of the die closure by means of the hydraulic fluid.

Figure 6:
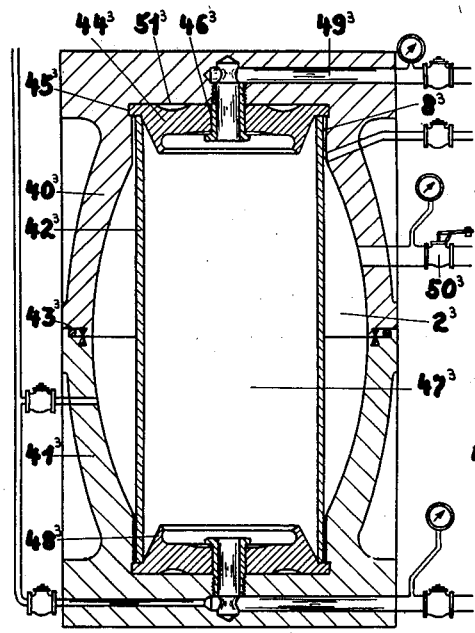
Fig. 6 shows an axial section of an embodiment for forming of barrel bodies with inserted core.

Referring now to the drawings and in particular to Figs. 1 and 2, the device comprises a die 1 having a recess 2, which die 1 may be closed by means of a cover 3. The latter is equipped with a centralization shoulder 4 which shoulder 4 engages a corresponding shoulder of the die 1.

The cover 3 is secured to the die by means of screw bolts 5 which may be inserted in slots disposed in the cover 3 and may be tightened by means of the nuts 6. A distancing ring 7 is disposed between the die 1 and the cover 3. By this arrangement an annular slot 8 is formed. The distancing ring 7 is of greater thickness than that of the metal sheet 10 disposed between the die and the cover, in order to permit of a sliding movement for the metal sheet 10 between the die and its cover.

The cover 3 is equipped with a connection boring for the pressure pipe 9 and the die 1 is equipped with a similar boring leading to the suction pipe 11. Conduits which may be closed by valve means lead from the said pipes 9 and 11 to a hydraulic pressure pump (not shown).

Any sheet metal may be used as a workpiece, for instance a simple plane metal sheet 10 may be disposed on the top face of the open die 1. A proper distancing ring 7 brings about the annular slot 8 upon positioning and tightening of the cover 3 by means of the bolts 5 and units 8. After this is done, the recesses on both sides of the sheet metal are filled with pressure fluid. Upon starting operation of the pump, the hydraulic fluid exerts pressure in the direction of the arrow 12 in the space 13 of the cover, while at the same time a suction effect is provided in the recess 2 of the die 1, causing removal of the fluid in the recess 2 in the direction of the arrow 14. The metal sheet is drawn into the recess 2 through the mentioned pressure and vacuum operation, respectively. During the drawing or forming operation the portion of the metal sheet 10 disposed in the slot 8 follows the forming process by a sliding movement thereof in view of the floating of the sheet metal on a veil-thin fluid layer. This process is continued until the metal sheet is pressed firmly toward the wall of the recess 2 of the die 1.

Upon opening of the device the finished hollow body may be removed from the die.

Instead of connecting the suction pipe 11 to a pump, it is also possible to provide a safety valve, one end of which is preferably connected with a tank disposed on a high level.

The filling up of the die may be achieved from such tank. Furthermore, the safety valve may be used to subject the fluid disposed in the recess 2 of the die 1 to controllable counter-pressure.

As shown in Fig. 1, the die 1 may be equipped with a sealing ring 15 in order to prevent the penetration of pressure fluid into the recess 2 of the die 1.

The sealing ring 15, which is preferably made of rubber or any other suitable material, is then disposed in an annular recess 16 of the cover 3. The sealing ring 15 rests with its preferably wide engaging face on the metal sheet 10.

Upon feeding the pressure fluid into the pressure pipe 9 of the cover 3, the sealing ring 15 prevents the penetration of the hydraulic fluid into the annular slot 8, thereby permitting the sliding of the plane sheet metal 10 without exertion of the pressure of the fluid and also preventing the overflow of the pressure fluid into the recess 2 of the die 1. It is also possible to provide a second sealing ring 17 below the forming radii, so that the edge of the metal sheet 10 engages firmly the wall of the recess 2 of the die 1 even after leaving the annular slot 8 and also to prevent the entrance of the pressure fluid between the wall of the die 1 and the sheet metal.

The structure of the device shown in Fig. 2 is substantially identical with that of Fig. 1 and comprises again a die 1' having a recess 2' which die may be closed by a cover 3'. The centralization shoulder 4' engages a proper shoulder of the die 1' to centralize the cover 3' on the die 1'. Borings are provided in the die 1' and cover 3' to remove and feed, respectively, the pressure fluid through the pipes 11' and 9' in the direction of the arrows 14' and 12', respectively. A distancing ring 7' provides an annular space between the die 1' and the cover 3'.

In the structure shown in Fig. 2, the cover 3' has an annular recess 16' which receives a spring-biased holding plate 19'.

The recess 2', by example devised for the forming of a bucket, is closed up by the cover 3' supported by the distancing ring 7', thereby sealing fluid-proof the recess 2' of the die 1'.

The holding plate 19' comprises a highly polished pressure member supported by an elastic base 15' and is yieldingly maintained in the cover 3' by springs 20'.

Set screws 21', which are disposed in liquid-proof borings 22', limit the movement of the holding plate 19'.

The workpiece 10' to be formed is disposed between the upper face of the die 1' and the holding plate 19'. The pressure force is chosen by the measurement of the distancing ring 7' in such manner that no folds may form on the metal sheet and still such a space remains that a veil-thin fluid layer provides a small friction for the movement of the metal during the forming process.

During the pressing operation the pressing fluid enters, in view of the very high pressure, the space below the holding plate 19' and also enters between the meal sheet and the upper face of the die 1'. In this manner, a fluid veil is formed between these faces, which eliminates the friction between the workpiece and the die, despite the fact that the holding plate 19', preventing the forming of folds in the metal sheet, is provided.

Figs. 3, 4 and 5 show a structure of the device for forming of hollow bodies which are very deep in relationship to their diameter.

The die $1^2$ comprises a forming space $2^2$ which leads into the upper plane surface $23^2$ of the die-block by means of a rounded draw-breast $18^2$.

The cover $3^2$ rests on the die-block $1^2$ by means of the distancing ring $7^2$, so that a slot $8^2$ is formed the width of which is slightly larger than the thickness of the metal sheet. The bottom face of the cover $3^2$ receives an elastically yielding holding plate $19^2$. The die-block $1^2$ and the cover $3^2$ are connected together pressure-proof by any suitable means (not shown).

Furthermore, the cover $3^2$ is equipped with an opening $24^2$ extending entirely therethrough in which a deep-drawing auxiliary piston $26^2$ oscillates and which auxiliary piston $26^2$ is sealed by means of the seal $25^2$. The auxiliary piston $26^2$ has a channel $27^2$ which is adapted for feeding the pressure fluid to the workpiece.

The forming space $2^2$ is formed by a recess on the upper end of a tool $28^2$, and the latter reciprocates in an opening $29^2$ of the die-block $1^2$. The tool $28^2$ is formed as a differential piston by providing an upper portion of smaller diameter than that of its guiding lower portion $31^2$, the latter being equipped with a packing $30^2$. The wall of the opening $29^2$ forms an annular shoulder $32^2$ against which the guiding portion $31^2$ of the tool $28^2$ abuts in its lifted position.

The opening $29^2$ is closed up by a cover plate $33^2$, the latter having a channel $34^2$ which is adapted for feeding the counter-pressure fluid into the die-block $1^2$.

The tool $28^2$ is provided with a longitudinal boring $35^2$ which leads from the opening $29^2$ to the forming space $2^2$. A second boring $36^2$ leads from the mentioned first boring $29^2$, preferably in radial direction, to the outer wall of the tool $28^2$. The second boring $36^2$ terminates into a longitudinal slot $37^2$ disposed along the entire length of the tool $28^2$ and ending freely at the upper end of the tool $28^2$.

The metal sheet $10^2$ is positioned in the slot $8^2$ (see Fig. 3) and upon feeding of counter-pressure fluid into the opening $29^2$, the tool $28^2$ will be pressed into its uppermost position, whereby also the forming space $2^2$ is filled with counter-pressure fluid.

Thereafter, pressure fluid will be fed through the channel $27^2$ and the metal sheet $10^2$ will be drawn now into the forming space $2^2$ in view of the hydraulic over-pressure. During this process the counter-pressure fluid will be pushed out again. Small portions thereof will enter the slot $8^2$ while the main portion of the fluid will enter the opening $29^2$ through the longitudinal boring $35^2$ of the tool $28^2$.

Upon terminating the hydraulic drawing process, which formed the metal sheet $10^2$ to conform to the upper form of the tool $28^2$, the auxiliary piston $26^2$ is pressed downwardly (see Fig. 4) so that the head of the latter enters the tool $28^2$. Upon further downward pressure of the deep-drawing auxiliary piston $26^2$, the tool $28^2$ starts its downward movement and the clamped workpiece is further drawn, thereby forming the cylindrical drawing piece.

During this drawing process the counter-pressure fluid will be partly removed through the channel $34^2$, yet a portion of the counter-pressure fluid will be pressed through the boring $36^2$ and the longitudinal slot $37^2$ into the guiding space between the die-block $1^2$ and the workpiece, the amount of the counter-pressure fluid feeding into the guide space being dependent upon the controllable counter-pressure. In the space between the inner wall of the die-block $1^2$ and the workpiece, the fluid forms a thin veil, which permits of the sliding of the workpiece during the deep-drawing process. Upon terminating the deep-drawing process, the auxiliary piston $26^2$ is withdrawn, the die-block is opened, and the finished workpiece is removed.

Thereafter, a new plane metal sheet may be positioned on top of the die-block $1^2$ and the entire drawing process may be repeated in the same described manner.

Figure 7:
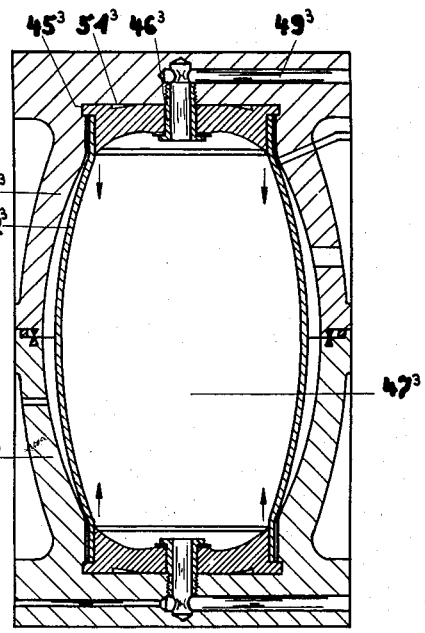
Fig. 7 shows an axial section of the embodiment shown in Fig. 6 in which the workpiece has been widened to barrel shape.
Figure 8:
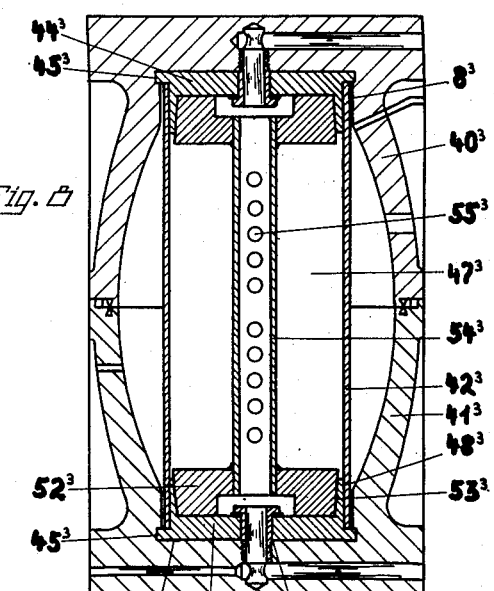
Fig. 8 shows the axial section of the embodiment shown in Fig. 6 with a varied form of the die for the forming of barrels.

In order to form pre-formed hollow bodies, a device as disclosed in Figs. 6, 7 and 8 may be used.

In accordance with the present invention, the device comprises in this structure an upper die $40^3$ and a lower die $41^3$ which, upon insertion of the properly pre-formed hollow cylinder $42^3$, are drawn or pressed towards each other.

Packings $43^3$ are provided between the upper and lower dies $40^3$ and $41^3$. Elastic end pieces $44^3$ of rubber or any other suitable material are disposed in the dies $40^3$ and $41^3$ at the ends of the hollow cylinder $42^3$. An annular groove $45^3$ disposed in the dies $40^3$ and $41^3$ receives complementary extensions of the end pieces $44^3$ to maintain the latter in position. The guide slot $8^3$ for the walls of the work cylinder $42^3$ is formed between the dies $40^3$ and $41^3$, respectively, and the end pieces $44^3$. The bottom of each of the end pieces $44^3$ is screwed to the bottom of the corresponding bottom of the dies $40^3$ and $41^3$ by means of sleeves $46^3$. The sleeve $46^3$ is also adapted for feeding the inner space $47^3$ of the hollow cylinder $42^3$. The bottom of the end piece $44^3$ is curved in inward direction and forms an annular flange $48^3$. The outer face of the annular flange $48^3$ is inclined inwardly to the inner wall of the hollow cylinder $42^3$. The space $47^3$ in the hollow cylinder $42^3$ and the inner space $2^3$ in the dies $40^3$ and $41^3$ are at first filled with fluid without pressure through proper ventilating and feeding conduits.

The drawing process is performed in the following manner: Pressure fluid is fed through the conduit $49^3$, whereby care is taken that the counter-pressure in the space $2^3$ is always slightly lower than that of the pressure fluid.

The counter-pressure may be easily controlled by means of the safety valve $50^3$. Fig. 7 shows the forming which may be achieved, by example, with a pressure up to one hundred atmospheres. The particular shape of the bottom of the end piece $44^3$ which is curved inwardly operates like an angle-lever under the suddenly appearing pressure, and the end piece $44^3$ is pressed thereby towards the bottom face $51^3$ of the die. At the same time the annular flange $48^3$ engages with its outer face the end of the hollow cylinder $42^3$ and seals the inner space $47^3$ from the outer space $2^3$ having counter-pressure.

During the now starting forming process, the cylinder $42^3$ is drawn away from the bottom of the dies in the direction of the arrows (see Fig. 7) upon opening of the valve $50^3$, a predetermined counter-pressure being maintained. The hollow cylinder $43^3$ is thus drawn by expanding its central portion. A sudden increase of pressure on the gauge indicates that the pressing process is terminated.

The embodiment shown in Fig. 8 is adapted for forming of sheet metals which require a higher pressure than one hundred atmospheres. The dies $40^3$ and $41^3$ may have the same shape as in the previously described embodiment. The arrangement of conduits, pressure gauge and safety valve may also be the same as in the previous embodiment. Yet, the end pieces $44^3$ are designed in such manner that they engage the bottom $51^3$ of the dies before pressure is applied. Each of the end pieces is also screwed to the dies $40^3$ and $41^3$ by means of a sleeve $46^3$. In this embodiment, however, the bottom of a disc $52^3$ engages the inner face of the end piece $44^3$ and the conically-shaped outer face $53^3$ of the disc $52^3$ engages the inner face of the end piece $44^3$. The outer face of the flange of the end piece $44^3$ engages thus the inner face of the hollow cylinder $42^3$ to be formed.

Since in this structure both ends of the hollow cylinder $42^3$ are provided with an end piece $44^3$, two discs $52^3$ are required. It is preferable to connect the two discs $52^3$ with a distancing ring $54^3$ which is equipped with perforations $55^3$ to permit of the feeding of pressure fluid into the inner space $47^3$ of the workpiece $42^3$. The distance between the discs $52^3$ is chosen in such manner that when the hollow cylinder $42^3$ is inserted into the lower die $41^3$, the discs $52^3$ press the outer face $48^3$ of the end pieces $44^3$ towards the inner face of the lower cylinder $42^3$ upon connecting the two die halves $40^3$ and $41^3$.

During the drawing process the flange $48^3$ of the end pieces $44^3$ is pressed between the outer face of the disc $52^3$ and the inner face of the hollow cylinder $42^3$ and thereby a good sealing is brought about between the pressure space and the counter-pressure space.

Figure 9:
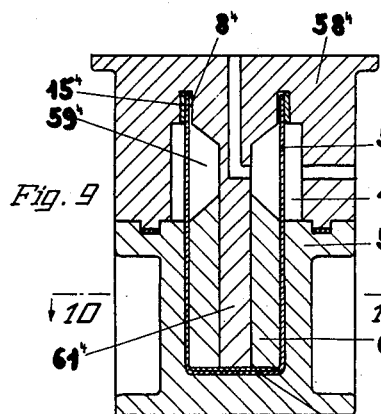
Fig. 9 is an axial section of the device for forming of hollow bodies having narrowed portions as cams.
Figure 10:
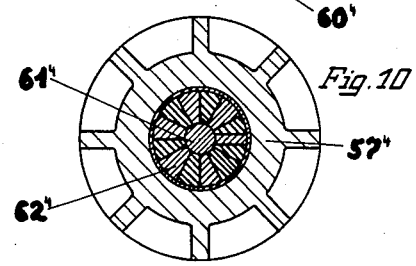
Fig. 10 is a section along the lines 10—10 of Fig. 9.

As shown in Figs. 9 and 10, the die may be devised for reducing the diameter of a cylindrical hollow body $56^4$, to form, for instance, milk cans or the like. In this case, the device is equipped with a lower die $57^4$ and an upper die $58^4$ which has an extension $61^4$. The latter reaches to the bottom $60^4$ of the pre-formed body $56^4$ and is disposed concentrically in the recess space $59^4$ of the upper die $58^4$. Cores $62^4$ are disposed next to the extension $61^4$, which cores $62^4$ determine the narrowed shape of the workpiece in its final form. A slot $8^4$ is formed at the upper end of the space $59^4$ of the upper die $58^4$, which slot $8^4$ receives the upper edge of the workpiece $56^4$ and is also equipped, as in the previously described embodiments with a packing $15^4$. Upon feeding pressure fluid into the pressure space $13^4$, a predetermined portion of the workpiece is drawn inwardly, whereby the portion of the workpiece cylinder disposed in the slot $8^4$ may slide out from the latter.

The device shown in Fig. 11 comprises a frame $66^5$ which is supported by a base plate $65^5$ and which carries a block $67^5$. The latter receives the hydraulically operated and hydraulically locked die. The block $67^5$ has a recess in which the die $1^5$ is exchangeably inserted, the die $1^5$ having the forming recess $2^5$. The block $67^5$ has a flat upper face $68^5$ which is flush with the upper face of the die $1^5$. The flat face $68^5$ of the block $67^5$ is formed to an outer guide edge $69^5$ extending above the face $68^5$, the guide edge being adapted to guide the cover $3^5$ into position. For this purpose the cover $3^5$ is equipped with a corresponding face $4^5$ which engages the inner face of the guide edge $69^5$. Furthermore, the cover $3^5$ is equipped with an upper flange $70^5$ which extends over the periphery of the block $67^5$.

The upper face $68^5$ of the block $67^5$ has a groove which receives the distancing ring $7^5$. The bottom face of the cover $3^5$ has preferably an elastic packing ring $15^5$.

A housing $71^5$ which surrounds the frame $66^5$ as well as the block $67^5$ resting thereon, is also disposed on the base plate $65^5$. The housing $71^5$ has bottom flanges $72^5$ to which hydraulic cylinders $73^5$ are secured by any convenient means. Piston rods $75^5$ extending from the pistons $74^5$, which reciprocate in the cylinders $73^5$, extend through openings in the upper flanges $76^5$ of the housing $71^5$ and are secured to the flange $70^5$ of the cover $3^5$. The upper flanges $76^5$ of the housing $71^5$ also support hydraulic cylinders $77^5$, the axis of which are preferably disposed in horizontal direction opposite the block $67^5$.

Each piston $78^5$ reciprocating in the cylinder $77^5$ carries a piston rod $79^5$, the end of which is enforced to a bolt $80^5$ which reciprocates in an opening $81^5$ of the guide edge $69^5$ of the block $67^5$. A boring $82^5$ coaxially disposed with the axis of the bolt $80^5$ extends through the face $4^5$, thereby locking the cover $3^5$ in closing position. A plurality of such locking means $80^5$ is disposed on the circumference of the block $67^5$.

The space above the top of the metal sheet $10^5$ is connected with a hydraulic accumulator or the like by means of the conduit $9^5$. The die recess $2^5$ is also connected with an accumulator by means of the conduit $11^5$. The drawing process is brought about by feeding pressure fluid to the workpiece and removing the counter-pressure fluid in the same manner as described above in connection with the other embodiments.

In order to deposit in the forming device a workpiece, as a metal sheet $10^5$, the control device $83^5$ causes the feeding of pressure fluid from the conduit $9^5$ through the conduit $84^5$ into the hydraulic cylinder $77^5$ and in particular in front of the piston $78^5$. By this means the bolt $80^5$ is withdrawn and is removed from the openings $82^5$ of the cover $3^5$.

Now another control device $85^5$ causes the feeding of the pressure fluid from the conduit $9^5$ through the conduits $86^5$ into the hydraulic cylinder $73^5$. The piston $74^5$ is lifted by the pressure exerted by the hydraulic fluid, and the piston rod $75^5$ secured to the piston $74^5$ lifts the cover $3^5$ from the block $67^5$.

The feeding of a new workpiece or the removal of a finished workpiece may be achieved in the raised position of the cover $3^5$.

Upon lowering of the cover $3^5$, the forming device is closed again. The closing step may be achieved by the own gravity of the elements to be lowered, whereby the pressure fluid is removed freely or the pressure fluid can be sucked off in order to accelerate the closing step. When the cover $3^5$ reaches its closing position, the shifting of the control device $83^5$ causes the feeding of pressure fluid behind the pistons $78^5$ of the hydraulic cylinders $77^5$, and accordingly the bolts $80^5$ are moved into the openings $82^5$ of the cover $3^5$. In this position the forming device is ready again for the next forming process.

While I have disclosed several embodiments of the present invention, it is to be understood that these embodiments are given by example only and not in a limiting sense, the scope of the present invention being determined by the objects and the claims.

I claim:

1. The device for forming hollow bodies from a working element under hydraulic pressure comprising a pressure die, having an operative pressure face and having means for feeding pressure fluid to the pressure side of the said pressure die, the said feeding means terminating in the said operative pressure face of the said pressure die, and a forming die defining a forming chamber of a shape conforming to that to be formed from the said working element and having a shoulder surrounding the said chamber of the said forming die, the said chamber having fluid under pressure therein, a sealing ring carried by and extending beyond the operative pressure face of the said pressure die, disposed opposite the said shoulder of the said forming die, and engaging the face of the said working element, a distancing ring disposed at the periphery of the said shoulder of the said forming die spacing apart the latter from the said pressure die a distance which is greater than the thickness of the said working element together with that portion of the said sealing ring extending beyond the said operative pressure face of the said pressure die to provide space for a veil-thin layer of hydraulic fluid between the said working element and the said shoulder of the said forming member and to surround the edge portion of the said working element with the pressure fluid of the said forming chamber, the said pressure prevailing in the said pressure die being greater than that prevailing in the said forming die, so that the pressure fluid from the said pressure die will engage the face of the said working element within the limits of the said sealing ring, while the same face of the said working element outside the limits of the said sealing ring and the opposite face of the said working element is engaged by the fluid of the said forming chamber and a veil-thin layer of pressure fluid from the said forming chamber is disposed between the said opposite face of the said working element and the shoulder of the said forming die.

2. The device, as set forth in claim 1, in which the said sealing member comprises an elastic ring which is pressed against the said face of the said working element.

3. The device, as set forth in claim 2, in which the said elastic ring comprises a holding plate, a plurality of springs disposed in the said pressure die and yieldingly pressing against the said holding plate, and in which the said pressure die has axially disposed threaded borings and set screws threaded in the said borings and engaging the said holding plate, the said set screws being adjusted from the outer face of the said pressure die through the said threaded borings, to limit the position of the said holding plate.

4. The device, as set forth in claim 1, which device is adapted to form hollow bodies from a working element consisting of a hollow tubular member, in which the said sealing ring comprises an end piece disposed at the open end of the said hollow tubular member in order to seal off the pressure prevailing in the said pressure die from the pressure prevailing in the forming die, the said end piece having an angular flange projecting into the open end of the said hollow tubular member and the said angular flange engaging the inner face of the said hollow tubular member upon applying pressure into the said pressure die.

HEINRICH EWALD KRANENBERG.

References Cited in the file of this patent

UNITED STATES PATENTS

| Number | Name | Date |
|---|---|---|
| 1,522,051 | Fulton et al. | Jan. 6, 1925 |
| 2,038,304 | Middler | Apr. 21, 1936 |
| 2,082,199 | Dake | June 1, 1937 |
| 2,284,773 | Sivian et al. | June 2, 1942 |
| 2,289,584 | McMillin et al. | July 14, 1942 |
| 2,348,921 | Pavlecka | May 16, 1944 |
| 2,407,855 | Stephens | Sept. 17, 1946 |
| 2,399,775 | Whistler et al. | May 7, 1946 |
| 2,417,794 | Werner | Mar. 18, 1947 |
| 2,531,539 | Smith | Nov. 28, 1950 |